United States Patent Office 2,896,390
Patented July 28, 1959

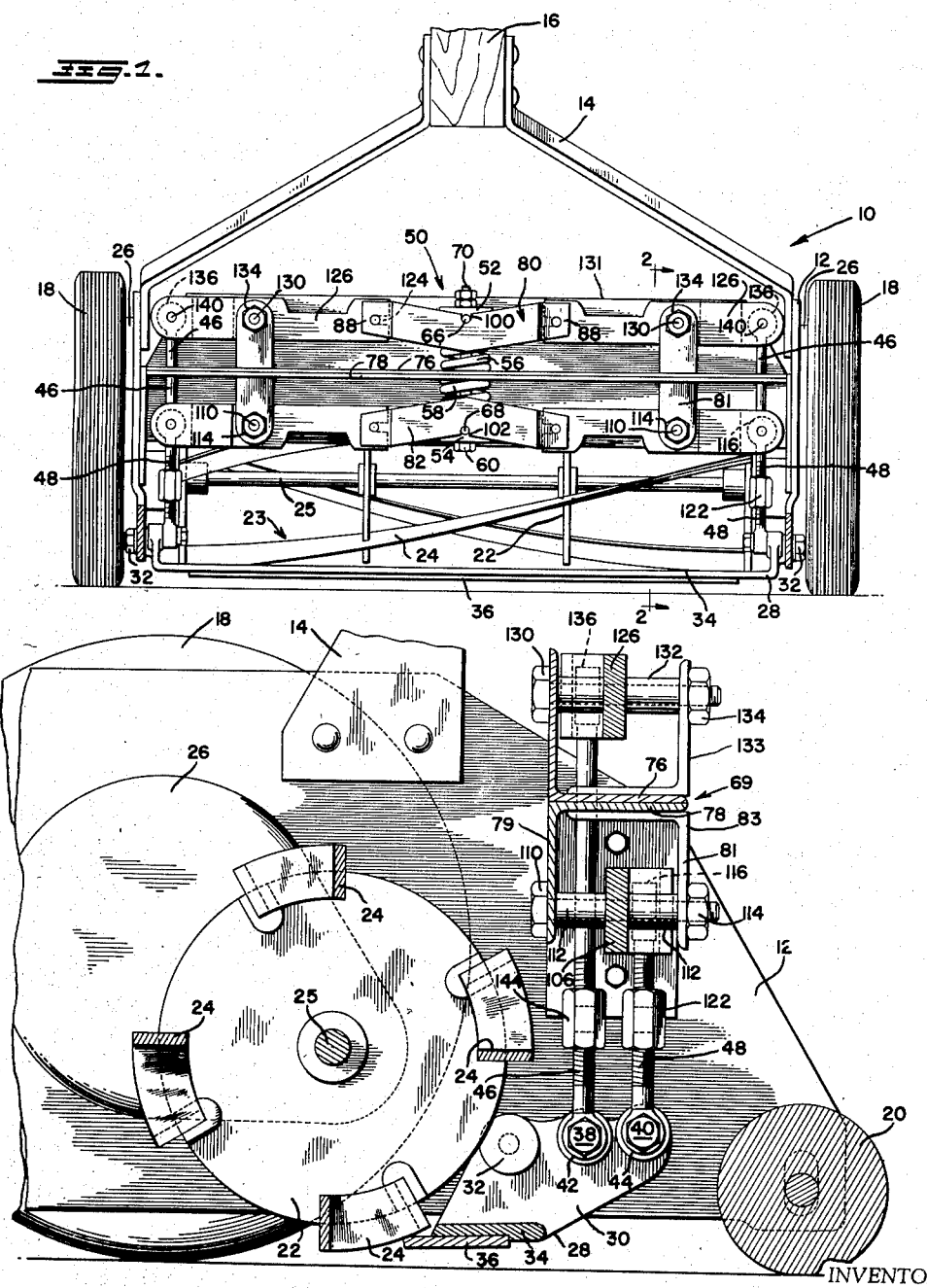
INVENTOR
IRA CUNNINGHAM

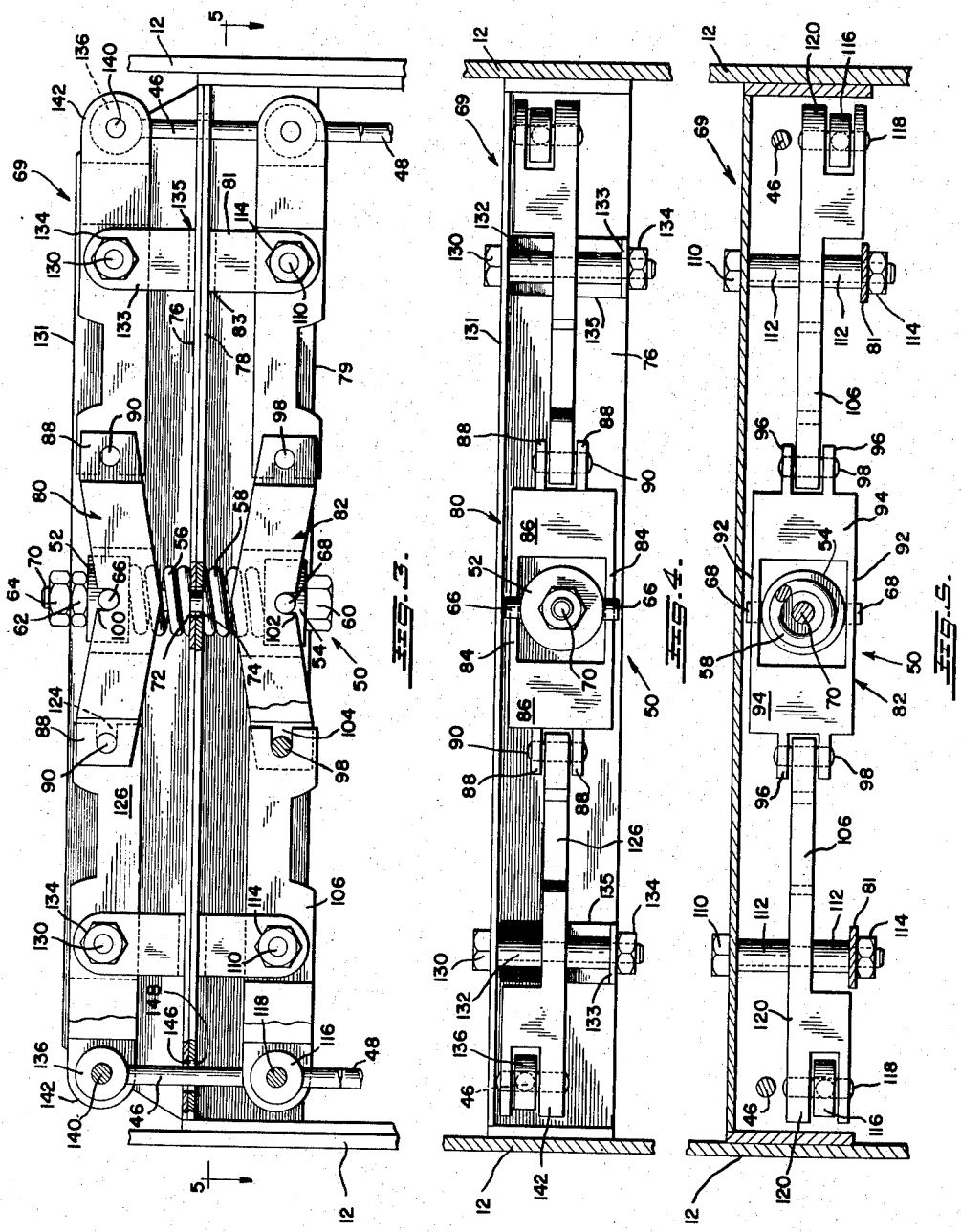

2,896,390

AUTOMATIC EQUALIZER ADJUSTMENT MECHANISM FOR REEL TYPE LAWN MOWERS

Ira Cunningham, Enid, Okla.

Application February 18, 1957, Serial No. 640,943

10 Claims. (Cl. 56—249)

This invention relates to the conventional reel type lawn mowers and the like, and it particularly relates to automatic equalizer adjustment mechanism for controlling the predetermined light flexible contact shearing pressure of the cutter bar or bed-knife against the reel blades, usually referred to as the pressure between the bed-knife and reel blades, as understood.

As is well known, reel type lawn mowers comprise a plurality of rotating, generally helical, blades moving across a relatively stationary blade carried by the chassis or frame of the lawn mower. This relatively stationary blade is usually referred to as a cutter bar or bed-knife which is usually adjusted with a rigid individual setscrew mechanism, as is commonly known. This apparatus operates by a shearing action of the helical blades as they move over the bed-knife, this shearing action being similar in a way to a pair of conventional type scissors, as understood.

During use, the cutting edges of the reel blades and relatively stationary cutter bar or bed-knife become dulled very rapidly so that a sharp shearing action on the turf grass is not always obtained, but, instead, the blades act, or effect a tearing, bruising action to the grass leaf tips, which action destroys the beauty of the lawn.

Heretofore there was no way to avoid this dulling effect as the cutting edges of the blades became worn off and dull. The reason is obvious, since with the conventional type of individual rigid adjustment mechanism the relatively stationary cutter bar or bed-knife is urged or practically forced underneath the reel assembly by wedge-like action, and if forced too much will lift the reel shaft upward against the top portion of the bearings at each end of the reel shaft. At this position the cutter edges of both the bar or bed-knife and reel blades would occupy the same plane, and consequently would not pass each other, locking at this position. In order to avoid this it is desirable for the cutting edges of the bed-knife and reel blades to very lightly touch each other from end to end in a uniform manner (as accurately as humanly possible, by sense of touch). This can only be done by skilled mechanics, and even they can effect only a temporary shearing action with the conventional type of individual rigid adjustment mechanism. In adjusting the conventional type of individual rigid adjustment mechanism, if the reel is raised or lifted upward to any extent, all of its weight would be riding upon the edges of the cutter bar or bed-knife and would set up a rapid wearing, grinding effect which would wear off and dull the cutting edges of the bed-knife and reel blades, consequently destroying the shearing action. This effect can only be repaired by resharpening, as is commonly known.

If the bed-knife of the prior type mowers were positioned so that the cutting edge would not touch the reel blades, thereby providing free reeling, there would be no shearing action effect. Consequently the result is a beating, whipping, dragging-like action between the bed-knife and reel blades. This also results in undue wear, wearing off and dulling of the cutting edges of all the shearing corners, due to the grit and dust settled on the turf grass which acts as a grinding agent. This also makes it necessary to resharpen the blades at regular intervals. It has also been found that individually adjusted, light spring devices do not perform any better than the conventional type of rigid setscrew adjustment mechanisms.

It is therefore one object of the present invention to provide a lawn mower device wherein the cutting edges of the blades will seldom require resharpening, thereby eliminating all undue wear.

Another object of the present invention is to provide a lawn mower device wherein the predetermined light flexible contact pressure of the cutter bar or bed-knife against the reel blades (usually referred to as the pressure between the bed-knife and reel blades) is controlled by an automatic equalizer adjustment mechanism, and transmitted through a dual linking mechanism to pivotal bolts connected indirectly to the cutter bar or bed-knife assembly, thereby effecting the desired cushioned shearing action between the bed-knife and associated reel blades, similar to the ordinary tinsmith shears.

Another object of the present invention is to provide a lawn mower device which, by eliminating all undue wear on the blades, makes it practical to use the finest cutlery steel for construction of the cutting bar or bed-knife and reel blades, such as used in the construction of the tinsmith's shears. This steel is a hard, tough, resisting material which is harder than grit or dust, but softer than diamond chips or dust. Consequently it resists wear from the usual grit and dust found on turf grass.

Other objects of the present invention are to provide an improved lawn mower device, of the character described, that is easily and economically produced, and which is sturdy and perfectly balanced in construction as well as highly efficient in operation when precision-made.

With the above and related objects in view, this invention consists in the details of construction and combination of parts, as will be more fully understood from the following description when read in conjunction with the accompanying drawings in which:

Fig. 1 is a front elevational view of the automatic equalizer adjustment mechanism mounted on a reel type lawn mower, embodying the present invention.

Fig. 2 is an enlarged sectional view taken on line 2—2 of Fig. 1.

Fig. 3 is an enlarged, detailed, front elevational view of the automatic equalizer adjustment mechanism shown in Fig. 1 and embodying the present invention.

Fig. 4 is a top plan view of the mechanism of Fig. 3.

Fig. 5 is a sectional view taken on line 5—5 of Fig. 3.

Referring now in greater detail to the drawing wherein similar reference characters refer to similar parts, there is shown a conventional reel type lawn mower, generally designated 10, comprising a chassis or frame 12 to which is connected a yoke 14. A handle 16 is mounted at the upper end of the yoke 14, as in common use.

At the forward end of the chassis or frame 12 is a pair of traction wheels 18 mounted on the outer sides of the chassis or frame 12. A roller 20 is provided at the rear of the chassis or frame 12 for movement over the ground in the ordinary manner. The roller 20 also serves as a gauge for uniform grass height cutting as commonly known and understood.

A reel 23 includes a plurality of blades of the helical type shown at 24. Although four blades are shown, any desired number may be used. These blades are supported by disks or brackets 22 of any desired design. These brackets 22 are supported by a common shaft 25. The reel blades 24 and bracket supports 22 are all assembled around the shaft 25 forming the reel 23. They are securely fastened together by any suitable means. This mechanism is situated between the sides of the chassis or frame 12 in proper alignment and is supported for rotation by any suitable type of bearings at each end of the shaft 25 in the usual manner. This mechanism is connected through gearing or other means, generally indicated by the gear housing 26, to the shaft, upon which the traction wheels 18 are mounted for simultaneous rotation with the reel 23. Although not shown, a conventional power means, such as a gasoline or electric motor, may be attached in a conventional manner to the chassis or frame 12 for driving the reel 23, the traction wheels 18, or both, as desired.

Also attached between the inner sides of the chassis or frame 12 is the cutter bar or bed-knife assembly 28. This cutter bar or bed-knife assembly 28 comprises means, in the form of plates 30, at each end of the assembly 28 which is pivotally connected to the corresponding sides of the chassis or frame part 12, by the pivot bolts 32. Extending between the plates 30 is a holder 34 which is made integral with the end plates 30. The cutter bar or bed-knife 36 is securely fastened, in the usual manner, by means of flat head screws, not shown, to the holder 34. This cutter bar or bed-knife 36 is usually adapted to contact the rotating blades 24 for shearing action.

At the opposite ends of the cutter bar or bed-knife assembly 28 on each end plate 30 are provided two pivot bolts 38 and 40. These bolts are situated any desired distance apart and are securely fastened in their respective positions on the inner side walls of the plates 30, as illustrated in Fig. 2. These bolts are positioned in the respective eyelets 42 and 44, for support and pivotal action. These eyelets 42 and 44 are made integral with the connecting rods 46 and 48, to be hereinafter described, after describing the automatic equalizer adjustment mechanism, which constitutes the present invention.

The automatic equalizer means or mechanism of this invention includes a king bolt assembly 50, shown in Fig. 3. This king bolt assembly 50 comprises two floating heads 52 and 54 of any desired dimensions, fitted loosely, and two heavy duty springs 56 and 58 of proper dimensions, as shown in the drawings. The king bolt is made integral with its head 60 of any desired dimensions and is provided on the opposite end with S.A.E. threads to threadedly engage with two machine nuts 62 and 64.

The floating head 52 is provided with two pivot pins 66 situated on opposite sides and securely fastened by any suitable means, as indicated in the drawings. Likewise the floating head 54 is provided with two pivot pins 68 of the desired dimensions situated on opposite sides and securely fastened by any suitable means, as illustrated in the drawings. To assemble the complete king bolt assembly 50, in its proper position in the housing 69, as illustrated in Fig. 3, the following steps are accomplished in order. With king bolt in hand, first place the floating head 54 over the king bolt shaft 70, letting it rest on the king bolt head 60; next, place heavy duty spring 58 over the king bolt shaft 70 letting it rest on the floating head 54. Then insert the threaded end of the king bolt through the holes 72 and 74 of the horizontal flanges 76 and 78 of the housing 69, and hold upward with the spring 58 against the horizontal flange 78 while placing the spring 56 over the king bolt shaft 70 and letting it rest on the horizontal flange 76. Then place the floating head 52 over the king bolt shaft 70 letting it rest on the spring 56. Thus, the floating heads 52 and 54 are secured on opposite ends of bolt shaft 70, floating head 54 being on the bolt head end 60, and floating head 52 being on the threaded nut end, against nut 62. Now, screw the nuts 62 and 64 down to the floating head 52 until all slack is eliminated in the king bolt assembly 50. However, care should be taken not to compress the heavy duty springs 56 and 58 until the complete automatic equalizer adjustment mechanism has been assembled, as will be explained later.

Now, the other parts may be assembled in orderly fashion, starting with the balancing yokes 80 and 82. The yoke 80 comprises a pair of thin side walls 84 (which may be of any desired dimensions or form, so long as they serve the specific purpose correctly), and spaced from each other by thick walls 86. The side walls 84 are of shallow V-form or shape in construction, while the end walls 86 are straight and thick (as shown in the drawings). Extending from each thick wall 86 outwards or parallel with the housing 69 are a pair of projecting parts 88 forming forks or clevis supports at each respective end of the yoke 80 and provided with openings or holes to match the pivot pins 90. These yokes 80 and 82 are illustrated as constructed or cast in one integral piece; however, the yokes may be constructed from thin sheet metal of any desired thickness in its entirety if desired. They are so constructed as to be interchangeable.

The yoke designated 82 is identical with the yoke designated 80, except that the yoke 82 operates in a reverse position, and its respective identification numerals are different. The lower yoke 82 comprises a pair of thin side walls 92 which are spaced from each other by thick walls 94. The side walls 92 are thin and of shallow V-form or shape in construction, while the end walls are straight and thick, as illustrated in the drawings. Extending from each thick wall outwards or parallel with the housing 69 are a pair of projecting parts 96 forming forks or clevis supports at each respective end of the yoke 82, and provided with openings or holes to receive the pivot pins 98.

These yokes 80 and 82, at the vertex of each V-shaped wall 84 and 92 are each provided with a notch or segment as at 100 and 102 which receives its respective pivot pin 66 or 68 extending laterally from its respective floating head 52 or 54, situated or positioned within its respective yoke 80 or 82.

The assembling of the yokes in place is as follows: First, place the upper yoke 80 over the floating head 52, then turn the floating head so the pivot pins 66 will be at right angles with the housing 69, and fit the notches 100 to the pins 66. Wedge the yoke up in this position until it is level, and leave until the assembling has been finished. Now, place the lower yoke 82 over the floating head 54; then turn the floating head so the pivot pins 68 will be at right angles with the housing 69, and fit the notches 102 to the pivot pins 68. Then wedge the yoke in its level position and leave in this position until finished with the assembling, ready for final adjustment.

Next in order, place each of the openings or deep notches 104 of the inner ends of the intermediate links 106 over their respective pivot pins 98 of the forks or clevis parts 96, as illustrated in the drawing Fig. 5, and follow up by inserting the two pivot bolts 110 in vertical wall 79 of flange 78 and vertical arm 81 of L-shaped bracket 83 into their respective openings or holes, with their spacer sleeves 112 mounted on opposite sides of the links 106 as shown in Fig. 5, and screw the nuts 114 on the bolts 110 as illustrated.

Next in order, place the eyelets 116 of the upper ends of the connecting rod 48 over their respective pivot pins 118 of the forks or clevis parts 120, as illustrated in Fig. 5, and securely fasten the pivot pins 118 in any suitable manner through the fork 120.

Next in order (after adjusting connecting rods 48 to approximately the desired length, and removing the wedging from the yoke 82), insert pivot bolts 40 through the eyelets 44 of the lower ends of the coupling rods 48, and connect in their respective positions, as provided on the plates 30 of the cutter bar or bed-knife assembly 28, as indicated in Fig. 2 of the drawing. These positions will be determined during the redesigning of the cutter bar or bed-knife assembly 28, during the experimental stages of development.

Next in order, place each of the openings or deep notches 124 of the inner ends of the intermediate links 126 over their respective pivot pins 90 of the forks or clevis parts 88 shown in Figs. 3 and 4 of the drawings, and follow up by inserting the two pivot bolts 130 in vertical wall 131 of flange 76 and vertical arm 133 of L-shaped bracket 135 into their respective openings or holes, with their spacer sleeves 132 mounted on opposite sides of the links 126, as illustrated in Fig. 4. Then screw the nuts 134 on the bolts 130, as shown in the drawings.

Next in order, place the eyelets 136, of the upper end of the connecting rods 46, over their respective pivot pins 140 of the forks or clevis parts 142, as illustrated in Fig. 4, and securely fasten the pivot pins 140 in any suitable manner through the fork 142.

Next in order, after adjusting coupling rods 46 to approximately the desired length, and extending them through mating holes 146 and 148 in horizontal wall of flanges 76 and 78, insert pivot bolts 38 through the eyelets 42 of the lower ends of the coupling rods 46, and connect them in their respective positions provided on the plates 30 of the cutter bar or bed-knife assembly 28, as indicated in Fig. 2 of the drawing. These positions will be determined during the designing of the cutter bar or bed-knife assembly 28, during the experimental stages of development.

Next in order, adjust the turnbuckles 144 of the connecting rods 46 as required, to eliminate all slack between pivot bolts 32 and the pivot pins 66. However, the heavy duty springs 56 and 58 are not compressed with the turnbuckles 122 or 144. It is now ready for final adjustment as will be explained hereafter.

The king bolt shaft 70 is fitted loosely through the openings 72 and 74 of the horizontal flanges 76 and 78 of the housing 69. As previously explained, it is provided with a floating head 54 and heavy duty spring 58 situated on the lower end, under the horizontal flange 78 of the housing 69. It is also provided with a similar floating head 52 and heavy duty spring 56 on the upper end situated above the horizontal flange 76 of the housing 69. Then the nuts 62 and 64 are screwed onto the upper threaded end of the shaft 70 of king bolt a sufficient distance to eliminate all slack between all parts of the king bolt assembly 50 as explained before.

Now, for final adjustment, advance the nut 62 any desired amount and lock with nut 64. This will simultaneously and equally squeeze both floating heads 52 and 54 and through them the heavy duty springs 56 and 58 which will effect an equalized opposing pressure or resistance from zero up to 200 pounds, more or less, to a predetermined maximum to be determined during the experimental stages of development.

Generally, the operating pressure or tension zone is estimated to be between about 10 and 30 pounds, or more. The desired primary, regulated, equally balanced working pressure or resistance (which will have to be determined during the experimental stages of development) is transmitted through both balancing yokes 80 and 82 and related linking mechanism coupled to the cutter bar or bed-knife assembly 28 through the pivot bolts 38 and 40 on the plates 30.

After all the adjustments have been made in proper order as explained above, the complex, combined, opposed pressure or resistance from the heavy duty springs 56 and 58 operating simultaneously as one unit, transmit this energy through their respective balancing yokes 80 and 82 opposing each other. Each separate balanced yoke individually transmits this same energy value through its individual intermediate links 126 and 106 and associated connecting rods 46 and 48 to its respective pivot bolts 38 and 40, connected to the plates 30 on opposite ends of the cutter bar or bed knife assembly 28. This provides means for a complex leverage mechanism to transmit the predetermined, light, flexible pressure effect through the pivot bolts 32, causing the cutter bar or bed-knife to press against the reel blades. This will effect the proper shearing action, which will eliminate all undue wear of the cutting edges.

During use, the operation of the automatic equalizer adjustment mechanism, does not visibly have any motion, but every pivot bolt and pin is flexible under the operation pressure or tension so as to absorb any degree of vibration caused by the light flexible shearing contact pressure. This will eliminate all undue wear of the cutter bar or bed-knife shearing corners. This distinguishes from the conventional type of rigid set screw adjustment mechanism.

Although this invention has been described in considerable detail, such description is intended as being illustrative rather than limiting, since the invention may be variously embodied, as, for example, the equalizer mechanism may be either built directly into the lawn mower, or it may be attached to an ordinary mower, and the scope of the invention is to be determined as hereinafter claimed.

Having thus set forth and disclosed the nature of this invention, what is claimed is:

1. In a lawn mower having a frame, wheels on said frame, a reel having rotary blades on said frame and connected to said wheels for simultaneous rotation therewith, a bed knife, and mounting means for said bed knife on said frame positioned adjacent the arc of rotation of said blades on said reel for effecting a mowing action in conjunction with said blades on said reel when said rotary blades are rotated; an automatic equalizer adjustment mechanism comprising a housing positioned on said frame above said bed knife and including a pair of apertured juxtaposed flanges, a king bolt extending through the apertures in said flanges, apertured balancing yokes on opposite sides of said flanges, means pivotally mounting said balancing yokes on opposite ends of said king bolt, a compression spring between each said last mentioned means and each flange, upper and lower links pivotally connected at one of their ends to each end of each yoke, brackets each engaging one of said flanges at one end pivotally connected to an intermediate point of each of said links at its other end, there being a bracket for each link, and the upper and lower brackets on either side of said yoke being in vertical alignment, and means connecting the opposite end of each link with said mounting means for said bed knife.

2. In a lawn mower having a frame, wheels on said frame, a reel having rotary blades on said frame and connected to said wheels for simultaneous rotation therewith, a bed knife, and mounting means for said bed knife on said frame positioned adjacent the arc of rotation of said blades on said reel for effecting a mowing action in conjunction with said blades on said reel when said rotary blades are rotated; an automatic equalizer mechanism comprising a housing positioned on said frame above said bed knife and including a pair of apertured juxtaposed flanges, a king bolt extending through the apertures in said flanges, apertured balancing yokes on opposite sides of said flanges, means pivotally mounting said balancing yokes on opposite ends of said king bolt, a compression spring between each said last mentioned means and each flange, upper and lower links pivotally connected at one of their ends to each end of each yoke, L-shaped brackets each having a horizontal leg engaging one of said flanges at one end and a vertical leg pivotally connected to an intermediate point of each of said links at its other end, there being a bracket for each link, and the upper and lower brackets on either side of said yoke being in vertical alignment, and means connecting the opposite end of each link with said mounting means for said bed knife.

3. In a lawn mower having a frame, wheels on said frame, a reel having rotary blades on said frame and connected to said wheels for simultaneous rotation therewith, a bed knife, and mounting means for said bed knife on said frame positioned adjacent the arc of rotation of said blades on said reel for effecting a mowing action in conjunction with said blades on said reel when said rotary blades are rotated; an automatic equalizer adjustment mechanism comprising a housing positioned on said frame above said bed knife and including a pair of apertured juxtaposed flanges, a king bolt extending through the apertures in said flanges, aperture balancing yokes on opposite sides of said flanges, means pivotally mounting said balancing yokes on opposite ends of said king bolt, a compression spring between each said last mentioned means and each flange, upper and lower links pivotally connected at on of their ends to each end of each yoke, L-shaped brackets each having a horizontal leg engaging one of said flanges at one end and a vertical leg pivotally connected to an intermediate point of each of said links at its other end, there being a bracket for each link, the upper and lower brackets on either side of said yoke being in vertical alignment, and means connecting the opposite end of each link with said mounting means for said bed knife, said connection comprising a coupling rod connected at one end to each upper link and a coupling rod connected at one end to each lower link, the other end of each coupling rod being connected to said mounting means.

4. In a lawn mower having a frame, wheels on said frame, a reel having rotary blades on said frame and connected to said wheels for simultaneous rotation therewith, a bed knife, and mounting means for said bed knife on said frame positioned adjacent the arc of rotation of said blades on said reel for effecting a mowing action in conjunction with said blades on said reel when said rotary blades are rotated; an automatic equalizer adjustment mechanism comprising a housing positioned on said frame above said bed knife and including a pair of apertured juxtaposed flanges, a king bolt extending through the apertures in said flanges, apertured balancing yokes on opposite sides of said flanges, means pivotally mounting said balancing yokes on opposite ends of said king bolt, a compression spring between each of said last mentioned means and each flange, upper and lower links pivotally connected at one of their ends to each end of each yoke, L-shaped brackets each having a horizontal leg engaging one of said flanges at one end and a vertical leg pivotally connected to an intermediate point of each of said links at its other end, there being a bracket for each link, the upper and lower brackets on either side of said yoke being in vertical alignment, means connecting the opposite end of each link with said mounting means for said bed knife, said connection comprising a coupling rod connected at one end to each upper link and a coupling rod connected at one end to each lower link, the other end of each coupling rod being connected to said mounting means, each coupling rod being comprised of two aligned threaded members, and a turnbuckle connecting said two aligned threaded members.

5. The structure of claim 1, where in said king bolt is provided at its opposite ends with floating heads, each floating head including two transversely extending pivot pins, and wherein said yokes are provided with notches adapted to engage said pivot pins to form the means pivotally mounting said balancing yokes.

6. The structure of claim 1, wherein each balancing yoke is provided at each end with a transversely extending pivot pin and wherein each link is provided with a notch engaging said last mentioned pivot pins for providing the pivotal connections between said yoke and said links.

7. The structure of claim 5 wherein each yoke comprises a rectangular member having a central aperture through which said king bolt extends, and wherein pairs of projecting parts forming a clevis extend from each end of each yoke and wherein the pivot pins extend laterally between said projecting parts.

8. The structure of claim 7 wherein each of said yokes is of shallow V-shape, the apeces of said yokes being in confronting relation.

9. The structure of claim 3, wherein the end of each link is bifurcated, and the coupling rod is pivotally connected between the bifurcations of said last mentioned end.

10. The structure of claim 4, wherein the end of each link is bifurcated, and the coupling rod is pivotally connected between the bifurcations of said last mentioned end.

References Cited in the file of this patent

UNITED STATES PATENTS

| | | |
|---|---|---|
| 1,802,302 | Anderson | Apr. 21, 1931 |
| 1,872,119 | Carlson | Aug. 16, 1932 |
| 2,651,904 | Jatunn | Sept. 15, 1953 |

FOREIGN PATENTS

| | | |
|---|---|---|
| 622,700 | Great Britain | May 5, 1941 |